US012725185B2

(12) United States Patent
Ekfeldt et al.

(10) Patent No.: US 12,725,185 B2
(45) Date of Patent: Sep. 1, 2026

(54) SYSTEM AND METHOD FOR AUTOMATIC SUBJECT LINE GENERATION

(71) Applicant: Klaviyo, Inc, Boston, MA (US)

(72) Inventors: Karl Alexander Philip Ekfeldt, Cambridge, MA (US); Sarah Fathelbab, Cliffside Park, NJ (US); Ezra Freedman, Boston, MA (US); Joshua Edward Villarreal, Somerville, MA (US); Royce Ze Yong Yap, Singapore (SG)

(73) Assignee: Klaviyo, Inc., Boston, MA (US)

( * ) Notice: Subject to any disclaimer, the term of this patent is extended or adjusted under 35 U.S.C. 154(b) by 370 days.

(21) Appl. No.: 17/887,425

(22) Filed: Aug. 13, 2022

(65) Prior Publication Data

US 2024/0054539 A1 Feb. 15, 2024

(51) Int. Cl.

*G06Q 30/00* (2023.01)
*G06F 40/166* (2020.01)

(Continued)

(52) U.S. Cl.

CPC ....... *G06Q 30/0276* (2013.01); *G06F 40/166* (2020.01); *G06F 40/279* (2020.01); *G06Q 30/0243* (2013.01)

(58) Field of Classification Search

None

See application file for complete search history.

(56) References Cited

U.S. PATENT DOCUMENTS

| | | | |
|---|---|---|---|
| 6,519,571 B1 | 2/2003 | Guheen et al. | |
| 7,130,808 B1 | 10/2006 | Ranka et al. | |

(Continued)

FOREIGN PATENT DOCUMENTS

| | | | | |
|---|---|---|---|---|
| CN | 113824624 A | * 12/2021 | ............. | H04L 51/42 |
| CN | 116126620 A | 5/2023 | | |

(Continued)

OTHER PUBLICATIONS

Zhang, Rui, and Joel Tetreault. "This email could save your life: Introducing the task of email subject line generation." arXiv preprint arXiv:1906.03497 (2019). (Year: 2019).*

(Continued)

*Primary Examiner* — Michael Bekerman

(74) *Attorney, Agent, or Firm* — Batt IP A Law Corporation; Richard Batt

(57) ABSTRACT

Apparatuses, methods, and systems for generating subject lines for electronic messages of electronic campaigns. One method includes receiving, by a server, information related to the electronic campaign, preprocessing the received information, receiving a plurality of N subject lines generated based on the preprocess received information from a generative text engine model, reducing the N subject lines down to M subject lines, applying a fine-tuned enhancer model to enhance existing content for a selected one or more of the M subject lines, and displaying M subject lines with enhanced existing content to a merchant user. For an embodiment, reducing the N subject lines down to M subject lines includes filtering the N subject line to eliminate subject lines based on content, and generating similarity scores between each of the N subject lines and eliminating one or more subject lines based on a similarity with one or more other subject lines.

17 Claims, 8 Drawing Sheets

(51) Int. Cl.
*G06F 40/279* (2020.01)
*G06Q 30/0241* (2023.01)
*G06Q 30/0242* (2023.01)

(56) References Cited

U.S. PATENT DOCUMENTS 7,213,202 B1 5/2007 Kagle
7,257,772 B1 8/2007 Jones et al.
7,287,218 B1 10/2007 Knotz et al.
7,533,090 B2 5/2009 Agarwal et al.
7,752,607 B2 7/2010 Larab et al.
7,761,524 B2 * 7/2010 Carmel ................ G06Q 10/107 709/206
7,845,950 B2 12/2010 Driscoll et al.
7,975,000 B2 7/2011 Dixon et al.
7,975,223 B2 7/2011 Plumley et al.
8,117,267 B2 2/2012 Gardner et al.
8,224,905 B2 7/2012 Bocharov et al.
8,250,470 B2 8/2012 Takashima
8,341,224 B2 12/2012 Kasetty et al.
8,434,002 B1 4/2013 Shah et al.
8,484,156 B2 7/2013 Hancsarik et al.
9,237,233 B2 1/2016 Soundar
9,319,297 B2 4/2016 Aurisset
9,356,889 B2 * 5/2016 Caskey ................... H04L 51/02
9,430,454 B2 8/2016 Newman et al.
9,485,640 B2 11/2016 Bowers et al.
10,248,657 B2 4/2019 Prahlad et al.
10,313,387 B1 6/2019 Kras
10,331,775 B2 6/2019 Ryan et al.
10,438,230 B2 10/2019 Moran et al.
10,503,912 B1 12/2019 Kerr
10,701,005 B2 6/2020 Nutt et al.
10,817,663 B2 10/2020 Weald et al.
11,475,207 B2 10/2022 Xie et al.
11,483,272 B2 10/2022 Klink et al.
11,488,204 B2 11/2022 Pisupati et al.
11,710,000 B1 * 7/2023 Cuan ..................... G06F 16/345 709/206
11,734,724 B1 8/2023 Kingman, Jr. et al.
11,756,073 B2 9/2023 Blanchard et al.
11,769,171 B1 9/2023 Huang
11,783,122 B1 10/2023 Lawson et al.
11,783,643 B1 10/2023 Khiabani et al.
11,847,106 B2 12/2023 Urdiales et al.
11,880,650 B1 1/2024 Li et al.
12,026,742 B2 7/2024 Blanchard et al.
12,299,718 B1 5/2025 Johnson et al.
12,307,481 B2 5/2025 Blanchard et al.
12,387,236 B2 8/2025 Delbridge
12,412,181 B2 9/2025 Austin et al.
2002/0004745 A1 1/2002 Bascobert et al.
2004/0006598 A1 1/2004 Damm et al.
2005/0273705 A1 12/2005 McCain
2006/0162071 A1 7/2006 Dixon et al.
2006/0168024 A1 7/2006 Mehr et al.
2006/0225040 A1 10/2006 Waddington
2007/0100805 A1 5/2007 Ramer et al.
2007/0250576 A1 * 10/2007 Kumar ................. G06Q 10/107 709/206
2007/0271392 A1 11/2007 Khopkar et al.
2008/0065584 A1 3/2008 Motoyama et al.
2008/0144813 A1 6/2008 Damm et al.
2008/0178073 A1 7/2008 Gao et al.
2008/0189156 A1 8/2008 Voda et al.
2008/0208910 A1 8/2008 MacIntyre et al.
2008/0215692 A1 * 9/2008 Bosarge ............ G06Q 30/0254 709/206
2008/0275980 A1 11/2008 Hansen
2009/0006936 A1 1/2009 Parker et al.
2009/0018996 A1 1/2009 Hunt et al.
2009/0037546 A1 2/2009 Kirsch
2009/0089131 A1 4/2009 Moukas et al.
2009/0125518 A1 5/2009 Bailor et al.
2009/0132459 A1 * 5/2009 Hicks ................. G06Q 30/0269 706/52
2009/0222296 A1 9/2009 Wagner et al.
2010/0049534 A1 2/2010 Whitnah et al.
2010/0100370 A1 * 4/2010 Khouri .................... H04L 51/00 704/9
2010/0268661 A1 10/2010 Levy et al.
2010/0281074 A1 11/2010 Bailor et al.
2011/0078246 A1 3/2011 Dittmer-Roche
2011/0270710 A1 11/2011 Nash
2011/0307331 A1 12/2011 Richard et al.
2012/0042239 A1 2/2012 O'Brien
2012/0191546 A1 7/2012 Phelan et al.
2012/0233554 A1 9/2012 Vagell et al.
2012/0294514 A1 11/2012 Saunders et al.
2013/0066665 A1 3/2013 Tamhane et al.
2013/0080243 A1 3/2013 Dias
2013/0124956 A1 5/2013 Hatfield et al.
2013/0185311 A1 * 7/2013 MacMillan ........ G06Q 30/0201 707/755
2013/0198376 A1 8/2013 Landa et al.
2014/0019443 A1 1/2014 Golshan
2014/0025608 A1 1/2014 Miller et al.
2014/0033101 A1 1/2014 Rein et al.
2014/0100964 A1 4/2014 Kramer et al.
2014/0189714 A1 7/2014 Lawbaugh et al.
2014/0278747 A1 9/2014 Gumm
2014/0282125 A1 9/2014 Duneau
2014/0344013 A1 11/2014 Karty et al.
2014/0378071 A1 12/2014 Acosta
2015/0019662 A1 1/2015 O'Kane et al.
2015/0058428 A1 * 2/2015 Caskey ................... H04L 51/02 709/206
2015/0170213 A1 6/2015 O'Malley
2015/0220577 A1 8/2015 Sengupta et al.
2015/0227962 A1 8/2015 Wical et al.
2015/0294349 A1 10/2015 Capel et al.
2015/0347925 A1 * 12/2015 Zeng .................. G06Q 30/0242 709/206
2016/0070717 A1 3/2016 Bergner et al.
2016/0117717 A1 4/2016 Moreau et al.
2016/0132472 A1 5/2016 Campbell et al.
2016/0162929 A1 6/2016 Takiela et al.
2016/0189176 A1 6/2016 Newnham
2016/0210657 A1 7/2016 Chittilappilly et al.
2017/0019697 A1 1/2017 Hundemer
2017/0048323 A1 2/2017 Schlapfer et al.
2017/0178193 A1 6/2017 Jagannath et al.
2017/0221109 A1 8/2017 Liu et al.
2018/0053199 A1 2/2018 Mathis et al.
2018/0060299 A1 3/2018 Bastide et al.
2018/0081868 A1 3/2018 Willcock et al.
2018/0082326 A1 3/2018 Vlassis et al.
2018/0108029 A1 4/2018 Sinha et al.
2018/0219808 A1 8/2018 Wala et al.
2018/0225027 A1 8/2018 Cooke et al.
2018/0293502 A1 10/2018 Sengupta et al.
2018/0309764 A1 10/2018 Kras et al.
2018/0341873 A1 11/2018 Fellows
2019/0121827 A1 4/2019 Boswell et al.
2019/0122254 A1 4/2019 Duquette et al.
2019/0130333 A1 5/2019 Li et al.
2019/0197092 A1 6/2019 Thiesen et al.
2019/0228063 A1 7/2019 El-Sherif et al.
2019/0259041 A1 8/2019 Jackson
2019/0311301 A1 10/2019 Pyati
2020/0104340 A1 4/2020 Liu et al.
2020/0226640 A1 * 7/2020 Kakarlapudi ...... G06Q 30/0276
2020/0319996 A1 10/2020 Mordo et al.
2020/0327577 A1 10/2020 Truong et al.
2020/0342500 A1 10/2020 Kulkarni et al.
2020/0356624 A1 11/2020 Cai et al.
2020/0357012 A1 11/2020 Kendall et al.
2020/0394455 A1 12/2020 Lee et al.
2021/0004422 A1 1/2021 Sun et al.
2021/0034595 A1 2/2021 Tselikis et al.
2021/0042830 A1 2/2021 Burke
2021/0109897 A1 4/2021 Brechbuhl et al.
2021/0133287 A1 * 5/2021 Ayloo ................... G06F 40/274

(56) References Cited

U.S. PATENT DOCUMENTS

| | | | | |
|---|---|---|---|---|
| 2021/0133852 | A1 | 5/2021 | Vauthey et al. | |
| 2021/0157974 | A1 * | 5/2021 | Xie | H04L 51/52 |
| 2021/0184999 | A1 | 6/2021 | Klink et al. | |
| 2021/0241325 | A1 | 8/2021 | Clark et al. | |
| 2021/0294978 | A1 * | 9/2021 | Chhaya | G06F 40/30 |
| 2021/0357952 | A1 | 11/2021 | Liu et al. | |
| 2021/0389962 | A1 | 12/2021 | Li | |
| 2022/0036311 | A1 | 2/2022 | Didrickson et al. | |
| 2022/0113853 | A1 | 4/2022 | Nostrini et al. | |
| 2022/0188740 | A1 | 6/2022 | Nazarali et al. | |
| 2022/0283932 | A1 | 9/2022 | Arbour et al. | |
| 2022/0405783 | A1 | 12/2022 | Kondamudi et al. | |
| 2022/0405784 | A1 | 12/2022 | Kondamudi et al. | |
| 2022/0414325 | A1 | 12/2022 | Bhatnagar et al. | |
| 2022/0414686 | A1 | 12/2022 | Lawson et al. | |
| 2022/0414696 | A1 | 12/2022 | Kondamudi et al. | |
| 2022/0414705 | A1 | 12/2022 | Jain et al. | |
| 2023/0033753 | A1 | 2/2023 | Wang et al. | |
| 2023/0124697 | A1 | 4/2023 | Eidelman et al. | |
| 2023/0186342 | A1 | 6/2023 | Ding et al. | |
| 2023/0298368 | A1 | 9/2023 | Berger et al. | |
| 2023/0316186 | A1 | 10/2023 | Miller et al. | |
| 2023/0409821 | A1 | 12/2023 | Lawson et al. | |
| 2023/0413020 | A1 | 12/2023 | Lawson et al. | |
| 2024/0005365 | A1 * | 1/2024 | Chen | G06F 40/166 |
| 2024/0054539 | A1 | 2/2024 | Ekfeldt et al. | |
| 2024/0250922 | A1 | 7/2024 | Natoli et al. | |
| 2024/0281822 | A1 | 8/2024 | Austin et al. | |
| 2024/0312087 | A1 | 9/2024 | Agrawal et al. | |
| 2024/0338413 | A1 | 10/2024 | Fosse et al. | |
| 2024/0362676 | A1 | 10/2024 | Bangad et al. | |
| 2024/0394746 | A1 | 11/2024 | Delbridge | |
| 2025/0124471 | A1 | 4/2025 | Tan et al. | |
| 2025/0139356 | A1 | 5/2025 | Delbridge et al. | |
| 2025/0165897 | A1 | 5/2025 | Boker et al. | |
| 2025/0238839 | A1 | 7/2025 | Blanchard et al. | |
| 2025/0315606 | A1 | 10/2025 | Lawson et al. | |
| 2025/0342498 | A1 | 11/2025 | Delbridge | |
| 2025/0385884 | A1 | 12/2025 | Delbridge et al. | |

FOREIGN PATENT DOCUMENTS

| | | | | |
|---|---|---|---|---|
| EP | 4174577 | A1 | | 5/2023 |
| JP | 2022176802 | A | * | 11/2022 |
| WO | 2010138512 | A1 | | 12/2010 |

OTHER PUBLICATIONS

Hao, Yaru, et al. "Language models are general-purpose interfaces." arXiv preprint arXiv:2206.06336 (2022). (Year: 2022).*

11 Best Drag and Drop Word Press Page Builder Plugins, by Anna Fitzgerald, Nov. 13, 2020, pp. 1-21; https://blog.hubspot.com/website/top-5-free-drag-and-drop-wordpress-page-builder-plugins (Year: 2020).

A nonparametric Bayesian analysis of heterogeneous treatment effects in digital experimentation, Matt Taddy, Matt Gardner, Liyun Chen, David Draper, University of California, Santa Cruz, Dec. 18, 2015.

Cali, Sedef, et al. "A Bayesian based Approach for Analyzing Customer's Online Sales Data to Identify Weights of Product Attributes." Expert Systems with Applications, vol. 210, Aug. 9, 2022. (Year: 2022).

Frigui, Hichem, et al. "Unsupervised Clustering and Feature Weighting based on Generalized Dirichlet Mixture Modeling." Sience Direct: Information Sciences 274, pp. 35-54. Mar. 27, 2014. (Year: 2014).

Kamalbasha, Shafi, et al. "Bayesian A/B Testing for Business Decisions." Data Science: Analytics and Applications, p. 50-57. Mar. 5, 2020. (Year: 2020).

Kobayashi, Takumi. "Dirichlet-Based Histogram Feature Transform for Image Classification." National Institute of Advanced Industrial Science and Technology, CVPR 2014. (Year: 2014).

Lindholm (A 3-way Merging Algorithm for Synchronizing Ordered Trees—the 3DM merging and differencing tool for XML, published Sep. 2001, pp. 1-205) (Year: 2001).

Lindholm (A Three-way Merge for XML Documents, published Oct. 2004, pp. 1-10) (Year: 2004).

Lindholm (XML Three-way Merge as a Reconciliation Engine for Mobile Data, published Sep. 2003, pp. 1-5) (Year: 2003).

Miller, Alex, et al. "An Empirical Meta-analysis of E-Commerce A/B Testing Strategies." The Wharton School, University of Pennsylvania, 2020. (Year: 2020).

Paulo et al., Leveraging email marketing: Using the subject line to anticipate the open rate, Expert Systems with Applications, vol. 207, 2022, 117974.

The Bayesian Bootstrap, a short guide to a simple and powerful extension of the bootstrap, Matteo Courthoud, published in the Towards Data Science, Aug. 8, 2022.

The Bayesian Bootstrap, Donald B. Rubin, The Annals of Statistics, 1981, vol. 9, No. 1, 130-134.

WordPress Editor: Working With Blocks »Blocks, Jan. 1, 2021, pp. 1-6; https://wordpress.com/supporUwordpress-editor/blocks/ (Year: 2021).

Y. Yamamoto et al., "IoT-aware online shopping system enhanced with gaze analysis," 2016 World Automation Congress (WAC), Rio Grande, PR, USA, 2016, pp. 1-6, doi: 10.1109/WAC.2016.7583028.

Iachello, G. et al. (2005). Control, Deception, and Communication: Evaluating the Deployment of a Location-Enhanced Messaging Service. In: Beigl, M., Intille, S., Rekimoto, J., Tokuda, H. (eds) UbiComp 2005: Ubiquitous Computing. UbiComp 2005. Lecture Notes in Computer Science, vol. 3660. (Year: 2005).

ILC-CMAS Model, summary of research findings and implication for Content Creation and Management Automation System (CMAS), Choo Wou Onn;Halimah Badioze Zaman;Chue Wen Yeen, 2008 International Symposium on Information Technology, Year: 2008 I Conference Paper I Publisher: IEEE. (Year: 2008).

VWO, A/B Testing Guide, 2023 (Year: 2023).

"A Smart Email Client Prototype for Effective Reuse of Past Replies". IEEE. 2018. (Year: 2018).

Adam Hayes et al. Autoregressive Integrated Moving Average (ARIMA) Prediction Model, 2023.

H. Roth, J. Schiefer, H. Obweger and S. Rozsnyai, "Event data warehousing for Complex Event Processing," 2010 Fourth International Conference on Research Challenges in Information Science (RCIS), Nice, France, 2010, pp. 203-212, doi: 10.1109/RCIS.2010.5507380. (Year: 2010).

* cited by examiner

SYSTEM AND METHOD FOR AUTOMATIC SUBJECT LINE GENERATION

FIELD OF THE DESCRIBED EMBODIMENTS

The described embodiments relate generally to intelligent electronic message management. More particularly, the described embodiments relate to systems, methods, and apparatuses for automatic generation of the subject lines.

BACKGROUND

Merchants frequently send electronic messages to current and prospective customers to generate sales of products or services. The subject lines of the electronic messages can influence the success of the electronic messages.

It is desirable to have methods, apparatuses, and systems for automatic generation of the subject lines.

SUMMARY

An embodiment includes a computer-implemented method for generating subject lines for electronic messages of electronic campaigns. The method includes receiving, by a server, information related to the electronic campaign, preprocessing, by the server, the received information, receiving a plurality of N subject lines generated based on the preprocess received information from a generative text engine model, reducing the N subject lines down to M subject lines, applying a fine-tuned enhancer model to enhance existing content for a selected one or more of the M subject lines, and displaying M subject lines with enhanced existing content to a merchant user. For an embodiment, reducing the N subject lines down to M subject lines includes filtering the N subject line to eliminate subject lines based on for instance, sensitive content, and generating similarity scores between each of the N subject lines and eliminating one or more subject lines based on a similarity with one or more other subject lines.

Another embodiment includes a system for generating subject lines for electronic messages of electronic campaigns. The system includes a merchant server and a management server. For an embodiment, the management server is electronically connected to the merchant server through a network. For an embodiment, the management server is configured to receive information related to the electronic campaign from a merchant user of the merchant server, preprocessing the received information, retrieve a plurality of N subject lines generated based on the preprocess received information from a generative text engine model, and reduce the N subject lines down to M subject lines. For an embodiment, reducing the N subject lines down to M subject lines includes filtering the N subject line to eliminate subject lines based on content, generating similarity scores between each of the N subject lines and eliminating one or more subject lines based on a similarity with one or more other subject lines, applying a fine-tuned enhancer model to enhance existing content for a selected one or more of the M subject lines, and communicate the M subject lines to the merchant server, wherein the merchant server is configured to display the M subject lines with enhanced existing content to the merchant user.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for generating and improving subject lines for electronic messages of electronic campaigns. Improved subject lines results in better performance of the electronic campaigns.

Figure 1:
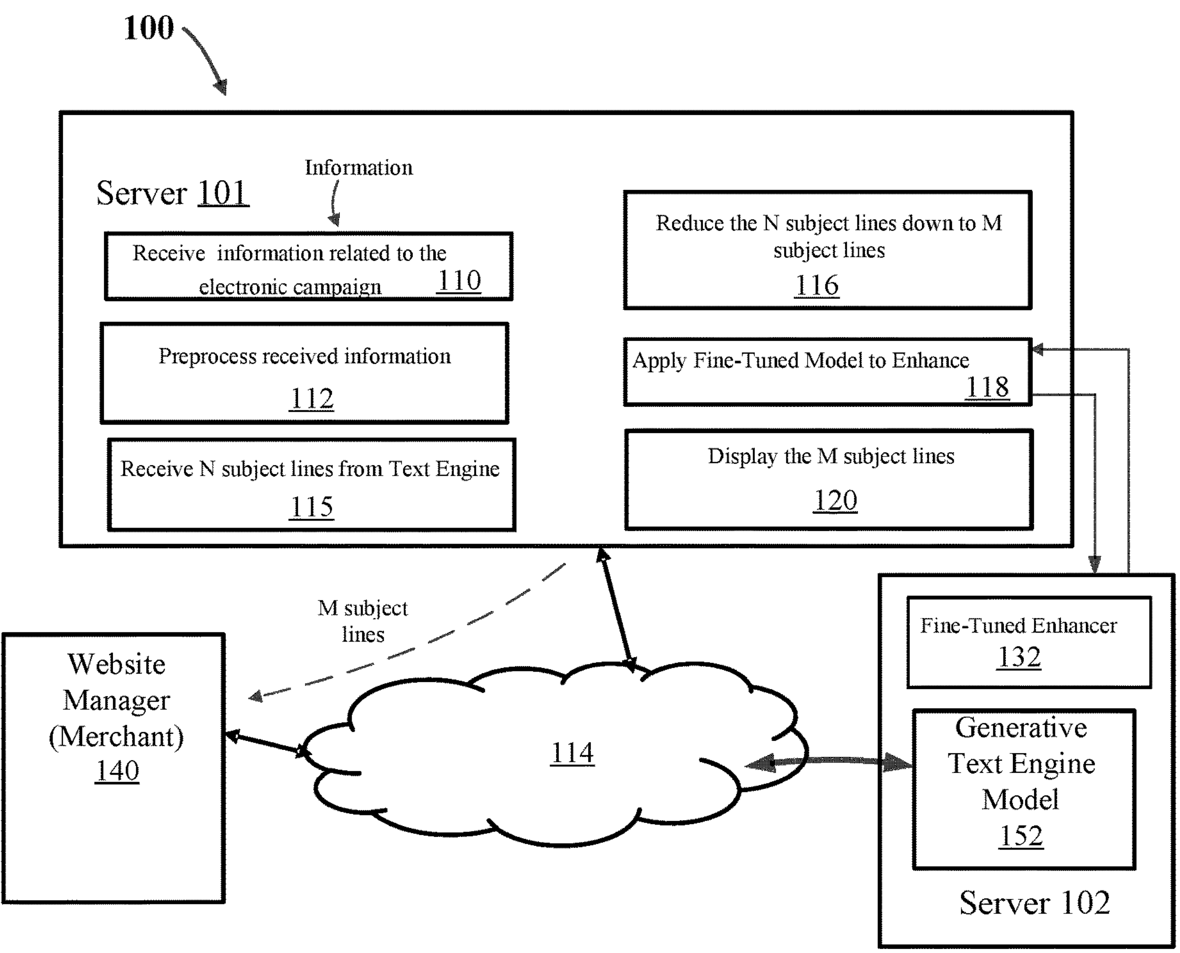
FIG. 1 shows a system for automatic subject line generation for electronic messages of an electronic campaign of a merchant, according to an embodiment.

FIG. 1 shows a system 100 for automatic subject line generation for electronic messages of an electronic campaign of a merchant, according to an embodiment. The system 100 includes a server 101 that is connected through an electronic network 114 to at least a merchant server 140. For an embodiment, the merchant server manages a merchant website. It is to be understood that the term "merchant" is being used liberally. That is, a merchant includes any type of business owner. For example, a merchant can include, for example, a teacher, a doctor, a restaurant owner, etc. Further, it is to be understood that at least some embodiments for generating subject lines for electronic messages of electronic campaigns are implemented at the server 101 which is accessed by the merchant on a client side of the server 101. Specifically, for an embodiment, the generation of the subject lines for electronic messages of electronic campaigns are performed by a UI (user interface) of the server 101.

For an embodiment, the server 101 receives 110 information related to the electronic campaign. For an embodiment, the electronic campaign provides a means for the merchant to market product and/or services of the merchant. The information includes, for example, a campaign type, a name, product, promotion, and/or brand name and/or description. Further, for at least some embodiments, the information further includes data on prior campaign information and activity undertaken by the merchant on the server 101. The server 101 may have this prior campaign information or may have access to the prior campaign information.

For an embodiment, the server 101 further operates to preprocess 112 the received information. For at least some embodiment, the preprocessing 112 includes, for example, employing formatting checks, removing keywords that could impact the performance of the text generator, and ensuring that the merchant provides sufficient information.

For an embodiment, the server 101 provides the preprocessed received information to a generative text engine model 152, and then the server 101 receives (115) a plurality of N subject lines generated based on the preprocessed received information from the generative text engine model 152. For an embodiment, the generative text engine model 152 returns text based on a given text prompt, attempting to match a pattern provided to it. For an embodiment, the generative text engine model is built on the AI (artificial intelligence) technology that is trained on large amounts of sample text such that with appropriate guidance, the generative text engine model 152 is capable of generating new text in human-readable sentences. For at least some embodiments, the generative text engine model 152 is trained further using tracked merchant and/or customer action data to improve the generative text engine model 152.

For an embodiment, the server 101 operates to reduce (116) the N subject lines down to M subject lines.

Reducing the Number of Subject Lines

The number of N subject lines can be reduced (116) to M subject lines based on various factors, which can be based on, for example, performing formatting, length, and content checks of the subject lines.

For an embodiment, reducing the number of subject lines includes filtering the N subject lines to eliminate subject lines based on content. For an embodiment, content of subject lines that includes inappropriate and/or sensitive words are filtered out. That is, for an embodiment, subject lines that include the questionable content are eliminated.

For an embodiment, subject lines having greater than a character threshold number of characters are reduced or eliminated. For example, for an embodiment, the server 101 performs checks on the number of characters in the subject lines and only allows, for example, one subject line above 50 characters. If all the subject lines fail the character threshold number, then a new set of subject lines are generated.

For an embodiment, the post processing (processing of the subject lines after generation by the text engine model 152) further includes fixing subject lines with capitalization issues. For example, a generating subject line might include "you'll love our sale" which may be fixed to "You'll love our sale". This additionally can be applied to subject lines enclosed in extraneous punctuation marks.

For an embodiment, reducing the number of subject lines includes generating similarity scores between each of the N subject lines and eliminating one or more subject lines based on a similarity with one or more other subject lines. That is, it can be desirable for each of the subject lines to be diverse relative to the other subject lines. Accordingly, a similarity score can be used to eliminate subject lines that are relatively similar compared to other of the subject lines. Note that it is possible to eliminate all be one unique subject line.

For an embodiment, cosine similarity scores are computed between subject lines using established vectorization methods. Namely, for an embodiment, the subject lines are embedded as vectors, and the projection of the two vectors on one another quantifies the syntactic similarities between the two subject lines. For an embodiment, when subject line pairs are determined to have high similarity scores, only one subject line of the pair is kept of the two subject lines. For an embodiment, the threshold is determined experimentally to determine what threshold of similarity works well. For an embodiment, a same similarity algorithm is run to compute pairwise similarity between each of the subject lines and the merchant-provided description, ensuring sufficient subject line difference from merchant inputs.

For an embodiment, the cosine similarity process includes taking two text strings and embedding them as vectors, meaning that the words of the text string are translated into a mathematical object that includes numbers that can be crunched (processed). For example, "My name is Josh" may be embedded as [1, 1, 1, 1, 0, 0] and "My name is John Smith" may be embedded as [1, 1, 1, 0, 1, 1]. The "cosine similarity" between these two vectors is the "distance" spanned by these two vectors, the shorter this distance, the more similar are the strings. For an embodiment, the cosine similarity threshold is selected to be ~0.8, meaning if the cosine similarity calculated is >0.8ish, the strings are too similar and one of the strings is eliminated and not show both to the user (merchant or customer).

As previously stated, it can be desirable to include diversity across the subject lines. For an embodiment, subject lines are maintained based on pairwise similarity scores. For an embodiment, if two subject lines are within a threshold of similarity, and therefore, highly similar, one of the subject lines is excluded to avoid a case of users (merchants) being presented with a narrow range of options to choose from.

For at least some embodiments, the cosine similarity scoring is applied to not just between subject lines, but also between subject lines and the merchant providing description (text). That is, for example, it is undesirable for a merchant to ask for subject lines for a "Memorial Day Sale", and for the subject line generator to then provide the subject line "Memorial Day Sale" or "Memorial Day Sale!" or something similar. For at least some embodiments, the similarity threshold used for determining that similarity between subject lines is different than the similarity threshold used for determining the similarity threshold between subject lines and the merchant provided description. Both of the similarity thresholds can be experimentally determined. Further, they can be adaptive from one merchant to the other.

For an embodiment, if the described methods of reducing the number of subject lines results in less than a threshold number of subject lines, the server 101 operates to resend a request for information (additional subject lines) from the generative text engine model 152.

Fine-Tuned Enhancer Model(s) for Enhancement

For at least some embodiments, a fine-tuned enhancer model 132 can be applied (118) to enhance existing content for a selected one or more of the M subject lines. That is, the remaining M subject lines are enhanced by the fine-tuned enhancer model 132 by adding content. For an embodiment, applying (118) the fine-tuned enhancer model 132 to enhance existing content includes adding emojis to the selected one or more of the M subject lines. For an embodiment, the inclusion of emojis, for instance, is determined by training an enhancement model on historical subject line-emoji pairs, gathering an emoji selection by calling the enhancement model on a subject line, and appending the emojis to the subject line according to predetermined patterns.

For at least some embodiments, applying the fine-tuned enhancer model 132 to enhance existing content includes adding information to enhance the selected one or more of the M subject lines. For an embodiment, the process for selecting and adding the enhancements includes identifying the nature of the content presented in the subject line and appending relevant emojis based on the content, allowing merchant users the ability to automatically adjust the tone of the subject lines based on their brand tone and adding best practice keywords to improve the success rate of the subject lines. For an embodiment, adding enhancements includes altering one or more keywords of the subject line(s). For example, adding enhancement could include highlighting that merchant users should be using the word “Offer” instead of “Discount” based on previously collected data on what works best for end-recipients (for example, customers).

For at least some embodiments, the fine-tuned enhancer model 132 is applied to a randomly selected one or more of the M subject lines. For an embodiment, one of the M subject lines that make it through the post processing check is selected with equal probability for adding additional subject matter, such as, an emoji. A random selection for post process checking can be advantageous because there is no bias in subject line selection. However, at least some embodiments include at least some intelligence in the subject line selection for enhancement. For an embodiment, it may be clear that an enhancement would improve one subject line but not others, and therefore, in this case only that subject line would be selected, and not the other subject lines.

At least some embodiments include multiple fine-tuned enhancer models. For example, one fine-tuned enhancer model may be applied to subject lines, and another for subject line enhancement, such as, emojis.

For at least some embodiments, after application of the fine-tuned enhancer model, the M subject lines with enhanced existing content are displayed (120) to a merchant user at the merchant server 140.

For an embodiment, the fine-tuned enhancer model 132 and the generative text engine model 152 operate on an exemplary server 102. However, clearly the fine-tuned enhancer model 132 and the generative text engine model 152 can operate on any configurations of multiple servers.

Tracking Merchant Actions

Figure 2:
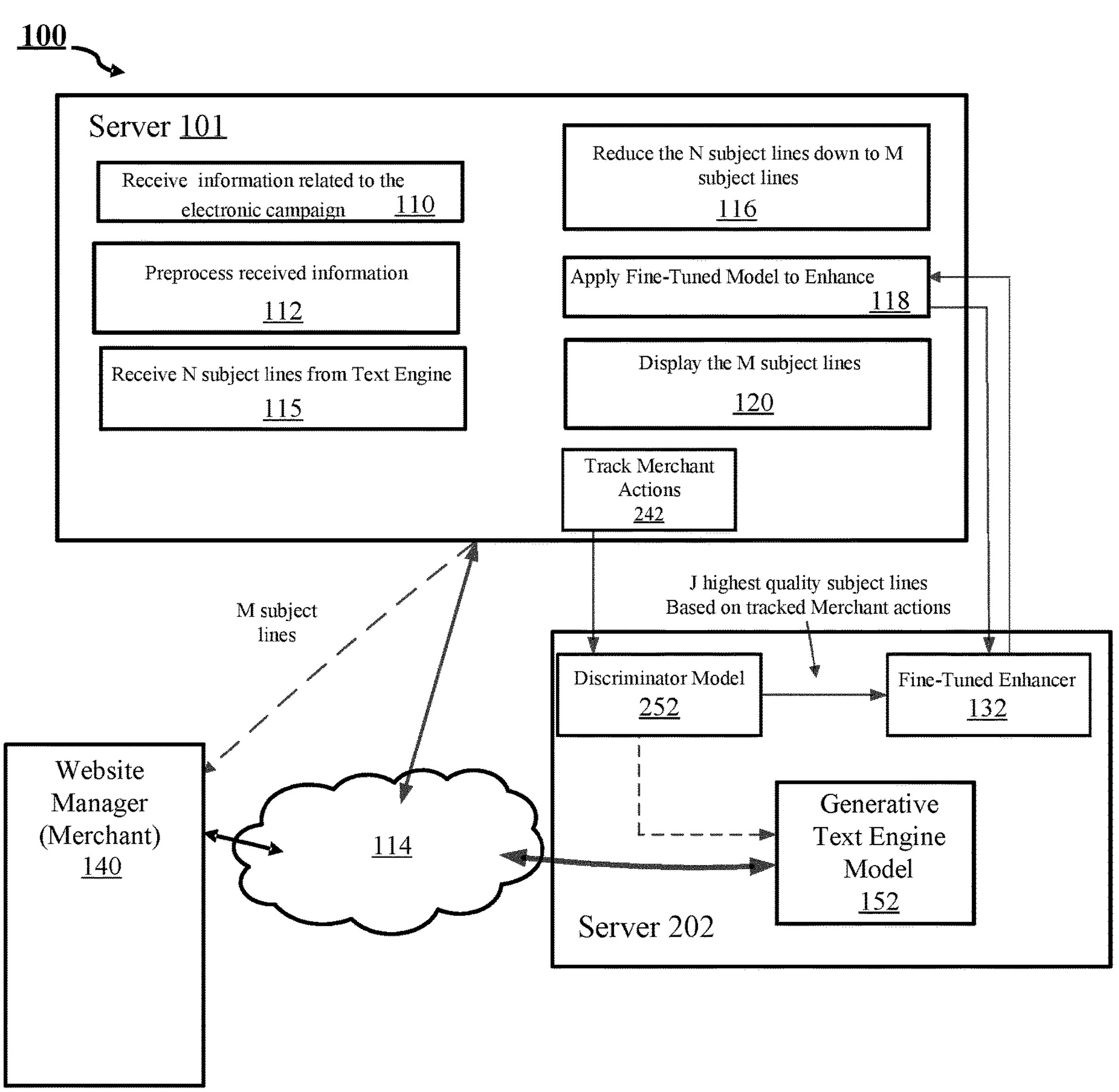
FIG. 2 shows another system for automatic subject line generation for electronic messages of an electronic campaign of a merchant, according to another embodiment.

FIG. 2 shows another system for automatic subject line generation for electronic messages of an electronic campaign of a merchant, according to another embodiment. For this embodiment, the server 101 additionally tracks merchant actions 242 based on the M subject lines displayed to the merchant of the merchant server 140. For at least some embodiments, the tracking of the merchant 242 includes the tracking the merchant clicking to select a displayed subject line of the M displayed subject lines. Clicking the displayed subject line indicates an interest by the merchant in the selected subject line and indicates a level of value of the selected subject line. For an embodiment, tracking of the merchant includes tracking the merchant modifying the subject line, and submitting a final revised subject line. Modifying a selected subject line provides a level of value of the modified and submitted subject line.

For an embodiment, a discriminator model 252 operates to assign a quality rating for each of the M subject lines based on the tracked merchant actions. For an embodiment, the discriminator model 252 is provided examples of subject lines and whether or not a merchant clicked on, “liked”, or performed some other action showing interest in a generated subject line. This allows the discriminator model 252 to predict whether or not a merchant will “like” a subject line that the generator comes up with, and based on the discriminator’s predicted probability that the merchant will “like” the subject line, the X subject lines with the highest X “quality ratings” can be chosen and then those X subject lines can be shown to the user (merchant), since they’re the “best” of the group of subject lines.

For an embodiment, different tracked merchant actions suggest a different level of quality of each of the subject lines. Accordingly, different specific actions, and/or combinations of actions performed by the merchant on the displayed M subject lines can yield a different ranking of the subject lines.

For an embodiment, the discriminator model 252 is trained on historical tracked merchant actions on previously generated subject lines, wherein the historical merchant actions include selection, editing, and actual use of a subject line in a campaign. For an embodiment, the trained historical model is equipped to assign a quality rating to new, previously unseen M subject lines after the subject lines have been generated, allowing selection of the predicted top-performing subject lines to display to the merchant.

Figure 6:
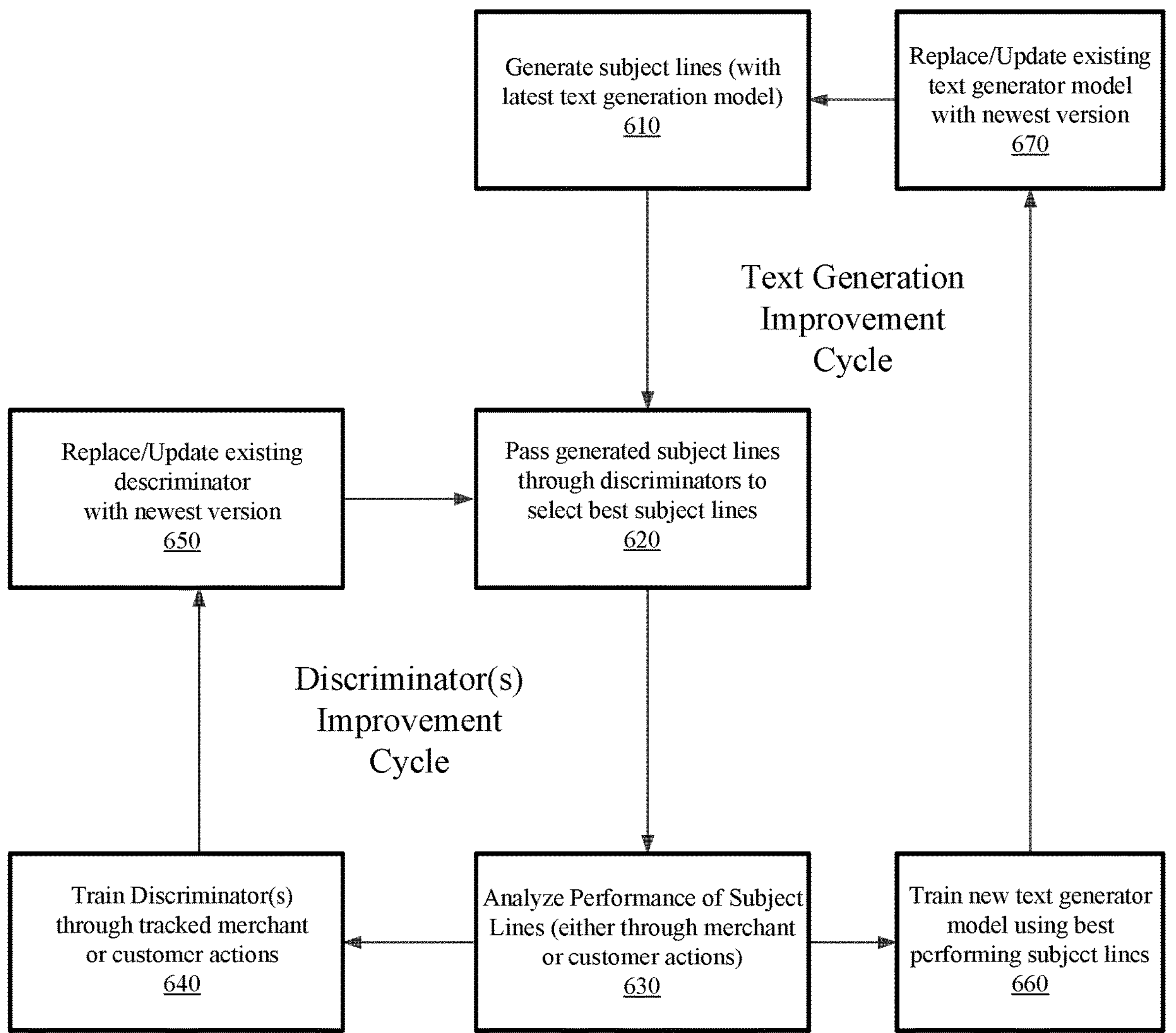
FIG. 6 is a flow chart that includes steps of a flow chart of a method for improvement cycles of discriminators and the text generator of an automatic subject line generation, according to an embodiment.

An embodiment further includes continuously updating the generative text engine model subject line generator models based on continuously tracked merchant and customer actions. The continuous updating of the generative text model is shown in FIG. 6.

For an embodiment, the fine-tuned enhancer model 132, the discriminator model 252, and the generative text engine model 152 operate on an exemplary server 202. However, clearly the fine-tuned enhancer model 132, the discriminator model 252, and the generative text engine model 152 can operate on any configurations of multiple servers.

Tracking Customer Actions

Figure 3:
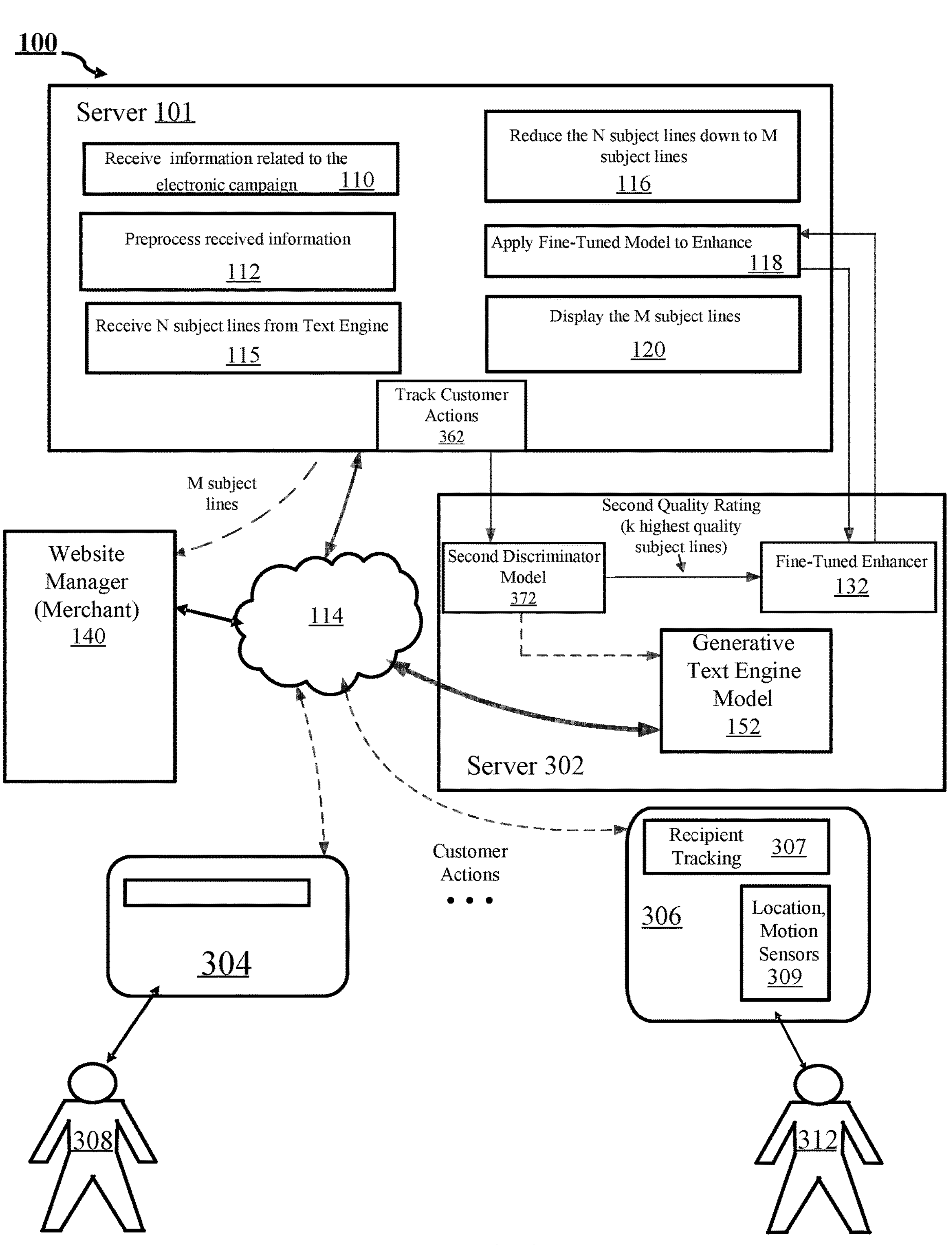
FIG. 3 shows another system for automatic subject line generation for electronic messages of an electronic campaign of a merchant, according to another embodiment.

FIG. 3 shows another system for automatic subject line generation for electronic messages of an electronic campaign of a merchant, according to another embodiment. FIG. 3 further includes customer devices 304, 306 of customers 308, 312 that are electronically connected to the server 101 and the merchant server 140 through, for example, the network 114. This embodiment further includes the server 101 tracking customer actions 362 based on the subject lines displayed to one or more customers 308, 312 of the merchant of the merchant server 140.

For an embodiment, the tracking of the customers includes tracking online activity and action by the customers. For an embodiment, a customer device (such as, devices 304, 306) alone or in conjunction with the server 101, or the merchant server 140 operates to sense the customer action data. For an embodiment, the sensed and tracked customer action data includes the customer device electronically sensing a customer performing an action or activity.

While the described embodiments are directed towards sensing customer action data, it is to be understood that at least some other embodiments can additionally or alternatively include the sensing of other types of data as well. For an embodiment, the sensed data can include merchant server data, such as, daily total or new visitors on the merchant website. That is, the sensed customer action data could be replaced with, for example, data of daily total or new visitors on the merchant website.

The customer action data may be tracked (counted) over various possible time periods (such as, by the second, minute, hour, day, week, or month) and may include one or more of customers (308, 312) being active on the website of the merchant server 140, a sent email bouncing, a customer canceled order, a customer starting a checkout, a customer clicking (selecting) an email, a customer opening email, a customer placing order, a customer receiving email, a customer refunding an order, a customer unsubscribing, a customer viewing a product, a customer adding to a list (a list in the marketing automation platform of the server 101 account), and/or a customer adding an item to their cart.

It is to be understood, however, that there are very few limitations on what event types (customer actions) can be published (provided) to a marketing automation platform of the server 101. Website managers (such as website manager of merchant server 140) can implement their own events (sensed customer actions) that make sense for their business and simply send those events over to the marketing automation platform of the server 101.

Further, as will be described, implementations of the devices 304, 306 that include mobile devices can additionally or alternatively include additional types of sensed customer actions. Such sensed customer action can include sensing a physical customer visit and/or purchase. That is, the sensing of the customer action can include sensing the customer visiting a physical location of the merchant, and/or the customer purchasing a product or service of the merchant at a physical store location of the merchant. Further, the sensed customer actions can include combinations or sequences of customer actions. For an embodiment, sensed customer actions are weighted based on the sensed customer actions. For an embodiment, only sensed customer actions having a weight, or a combination of weights that exceed a customer action threshold are considered a customer action for the purposes of detecting customer actions.

For an embodiment, the location monitoring of the mobile device of the customer is used to identify business locations visited by the recipient after receiving the campaign. Different businesses can be rated, wherein particular businesses yield a higher customer action score, and other particular businesses yield a lower engagement score. The customer action score of each business can be adaptively adjusted based on the electronic campaign of the merchant and can be adjusted based on other businesses visited by the recipient. For an embodiment, patterns of location visits by the recipient can be used to influence the level of customer action.

For an embodiment, motion of the recipient is tracked by location and motion sensors 309, and can be used to influence the level of customer action. Certain actions (motions) of the recipient may indicate different levels of customer action. For an embodiment, the computing devices 304, 306 may include a mobile phone, a smart watch, or a headset. Motion of the recipient can include tracking hand motions, direction of eyesight, and/or orientations of the recipient. Accordingly, whether the recipient is in a physical location of a product of the merchant can be determined. Further, how long the recipient holds or looks at a specific product of the merchant can be determined. Further, whether the recipient interacts with another recipient can be determined. All the sensed/tracked locations and motions of the customer can be included within a score of the customer action. Again, a score that exceeds a score threshold can be deemed a customer action. The actions and locations of the customer can be tracked 307 allowing patterns in the customer behavior to be determined. As described, sequences of behaviors by the customer can be ranked for determining of a score which is used for determining whether a customer action has occurred.

Further, for an embodiment, different businesses physically visited can be rated, wherein particular businesses yield a higher success score and other particular businesses yield a lower success score. The success score of each business can be adaptively adjusted based on campaigns and can be adjusted based on other businesses visited by the customer. For an embodiment, patterns of location visits by the customer can be used to influence the level of success. That is, for example, visiting a location of a business can be rated higher or lower based on a previous business visited by the customer.

As previously described, the customer tracking can include monitoring of web browsing of the customer. Online action and activity of the customer can influence the success score. Links accessed by the customer can be tracked. Websites visited by the customer can be tracked. Online purchases of the customer can be tracked. Each of the online web browsing of the customer can influence the success score of the customer actions.

For an embodiment, relationships between different customers are determined. For example, web tracking can determine online relationships between customers. Further, for an embodiment, a real physical relationship between customers can be established by tracking the locations of the different customers. Two customers may be identified as living together based on location tracking. Further, commonalities of recipients can be determined by identifying common locations, or common types of locations between the different customers. The influence one customer has on another customer can be measured and the influence can add or subtract from the success score.

For an embodiment, a level of customer action can be adaptively adjusted for each customer based on actions of an associated customer. An action by a related or common type of customer can influence how much an action by a customer influences the engagement determination or influences a success determination.

As previously described, the success determination of the described customer actions can be scored, and a score exceeding a score threshold can qualify as a customer action which is tracked.

For an embodiment, a second discriminator model 372 assigns a second quality rating for each of the subject lines displayed to the one or more customers based on the tracked customer actions. For an embodiment, the rankings of the customer actions influence the second quality rating of each of the subject lines. For an embodiment, the second discriminator model 372 is trained on historical tracked customer actions on previously generated subject lines, including opens of and clicks in email campaigns with a certain subject line. With this training the model assigns a quality rating to new, previously unseen M subject lines after they have been generated, allowing selection of the predicted top-performing subject lines to display to the merchant.

At least some embodiments include supplementing data used to train the fine-tuned enhancer model 132 with K highest quality rating subject lines as determined by actions of the one or more customers.

At least some embodiments further include continuously updating the generative text engine model 152 based on continuously generated second quality ratings as determined by the second discriminator model 372. A process for enhancing the operation of the generative text engine model 152 is shown in FIG. 6.

For at least some embodiment, assigning by the second quality rating by the second discriminator model comprises receiving, by the merchant server, customer actions for electronic messages having different subject lines and the same message content. An embodiment includes a form of A/B testing. For an embodiment, when it comes to forms or messages of an electronic campaign, the testing includes the creation of an "all things being equal" experiment, with one single difference that is hypothesized to generate better performance. For an embodiment, in the case of subject lines, a user (merchant) may choose to A/B test two subject lines, one from the generator, and one that the user (merchant) creates themselves, wherein the messages or forms are identical, but the subject lines are different. Further, for an embodiment, two generated subject lines can be A/B tested against each other, wherein the subject lines of two electronic messages are different, but the content of the electronic messages are identical. This allows for testing of the quality of the subject lines against each other which can be used to further advance the quality ratings of the different generated subject lines. For the purpose of assigning quality ratings through the discriminator that can predict best merchant reception, and through the second discriminator that can predict best customer reception, a combination of the two, rather than a competition between the two, the quality ratings assigned by each of these two discriminators can be utilized.

For an embodiment, the fine-tuned enhancer model 132, both discriminator models 252 and 372, and the generative text engine model 152 operate on an exemplary server 302. However, clearly the fine-tuned enhancer model 132, both of the discriminator models 252 and 372 and the generative text engine model 152 can operate on any configurations of multiple servers.

Figure 4:
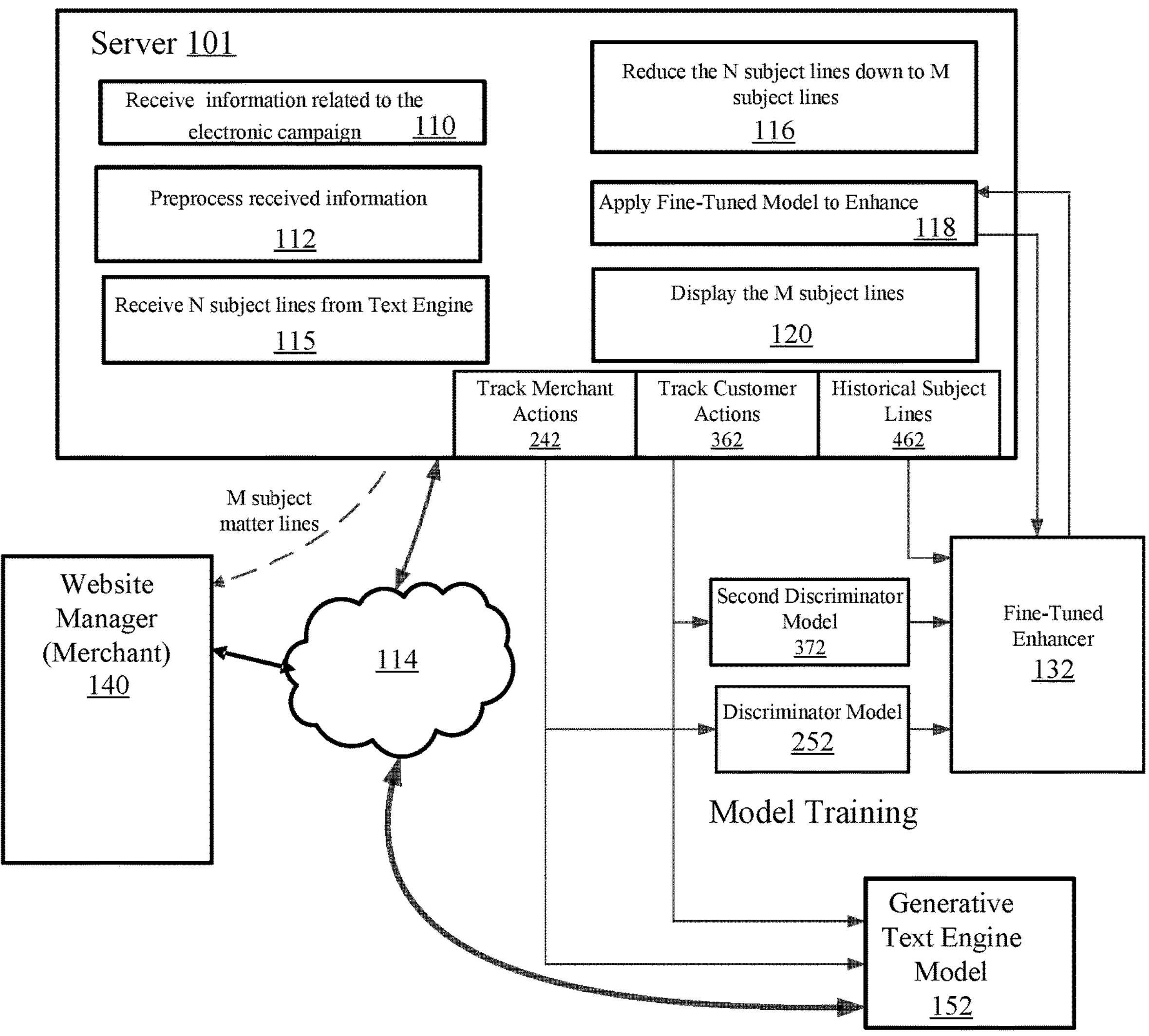
FIG. 4 shows another system for automatic subject line generation for electronic messages of an electronic campaign of a merchant that further include training of discriminator and/or fine-tuned enhancer models, according to another embodiment.

FIG. 4 shows another system for automatic subject line generation for electronic messages of an electronic campaign of a merchant that further include training of discriminator and/or fine-tuned enhancer models, according to another embodiment. For an embodiment, the first discriminator model 252 and the second discriminator model 372 both simultaneously provide highest quality subject lines to the fine-tuned enhancer model 132. For an embodiment, discriminator models can be used together to create a conclusive quality rating by for example creating a weighted sum of the outputs of the two models. For an embodiment, one of the discriminator models has a greater influence on the quality rating than the other of the discriminator models. For example, when a quality rating of one of the discriminator models suggests a very high quality (greater than a predetermined threshold) then that discriminator model provides the dominant quality rating. For example, the actions of the merchant user may indicate one subject line to have a high quality. However, the customer action may indicate that one other subject line is substantially (greater than the predetermined threshold). For an embodiment, the customer actions provide a better subject line quality indication than the merchant actions. Accordingly, in this case, the second discriminator model has a greater influence on the quality of the subject lines than the discriminator model.

For an embodiment, the discriminator 252 and the second discriminator 372 are combined to form a single discriminator model that is trained using data consists of both merchant and customer actions.

FIG. 4 further includes historical subject lines 462. This includes the tracking of past subject lines and the successes of the past subject lines. These successes can be used to improve the generation of future subject lines.

Figure 5:
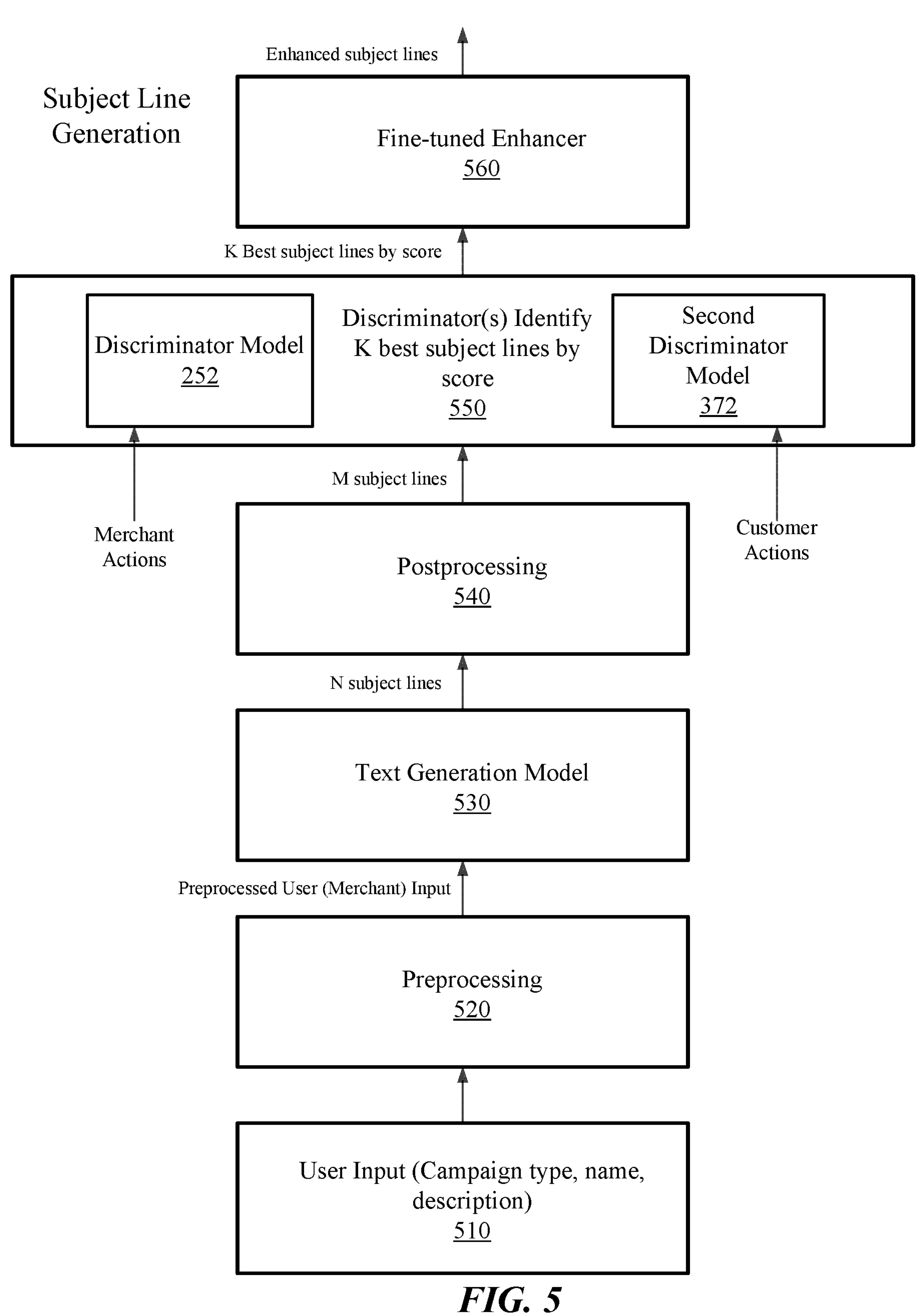
FIG. 5 is a flow chart that includes steps of a method for automatic subject line generation for electronic messages of an electronic campaign of a merchant, according to another embodiment.

FIG. 5 is a flow chart that includes steps of a method for automatic subject line generation for electronic messages of an electronic campaign of a merchant, according to another embodiment. As shown, a first step 510 includes receiving the merchant user inputs related to an electronic campaign. As previously described, the merchant user inputs include, for example, a campaign type, name, description, etc. A second step 520 includes preprocessing the merchant user inputs. As previously described, the preprocessing can include, for example, employing formatting checks, removing keywords that could impact the performance of the text generator, and ensuring that the merchant provides sufficient information. A third step 530 includes providing the preprocessed merchant input information to a text generation model which generates N subject lines that could be used by the merchant for an electronic campaign. A fourth step 540 includes postprocessing the N subject lines to reduce the number of subject lines down to M subject lines. The number of subject matter lines can be reduced by one or more of the many described embodiments for reducing the number of subject lines. A fifth step 550 includes identifying the K best subject lines of the M subject lines. For at least some embodiments, the K best subject lines are identified based on actions of merchant users and/or customers of the merchant. The merchant user action can be provided to a discriminator model, and the customer actions can be provided to a second discriminator model. The discriminators identify the best subject lines by sensing one or more of the merchant user actions and/or the customer actions. The sensing can take any of one or more of the many described merchant users and/or customer actions. For at least some embodiments, the actions include combinations and/or sequences of action for determining the quality of each subject line. A sixth step 560 includes enhancing the K higher quality rating subject lines with additional or modified contents. The modified K highest quality subject lines can be provided back to the generative text engine model to improve future subject line generation.

FIG. 6 is a flow chart that includes steps of a flow chart of a method for improvement cycles of discriminators and the text generator of an automatic subject line generation, according to an embodiment. A first step 610 includes generating the M subject lines with the latest text generation model. As previously described, the highest quality subject lines of a prior electronic campaign are feedback to the text generation model to allow for improvement of future subject line generation. A second step 620 includes passing the generated subject lines through one or more of the discriminator model or the second discriminator model for selecting the best quality subject lines of the generated subject lines. A third step 630 includes analyzing the performance of the best quality subject lines based on actions of the merchant user and/or customer users of the electronic campaign. A fourth step 640 includes training the discriminator model and the second discriminator model based on the merchant user and the customer user actions. A fifth step 650 includes replacing/updating the discriminator model and/or the second discriminator model based on the tracked merchant user and/or customer user actions. The updating/replacing of the discriminator models is performed by a discriminator(s) improvement cycle which can be performed for every electronic campaign.

An embodiment further includes a text generator model improvement cycle. A sixth step 660 training the text generator model using the best performing subject lines as determined by the actions of the merchant users and/or the customer users. A seventh step 670 includes replacing/updating/modifying the existing text generation model with a new version.

Figure 7:
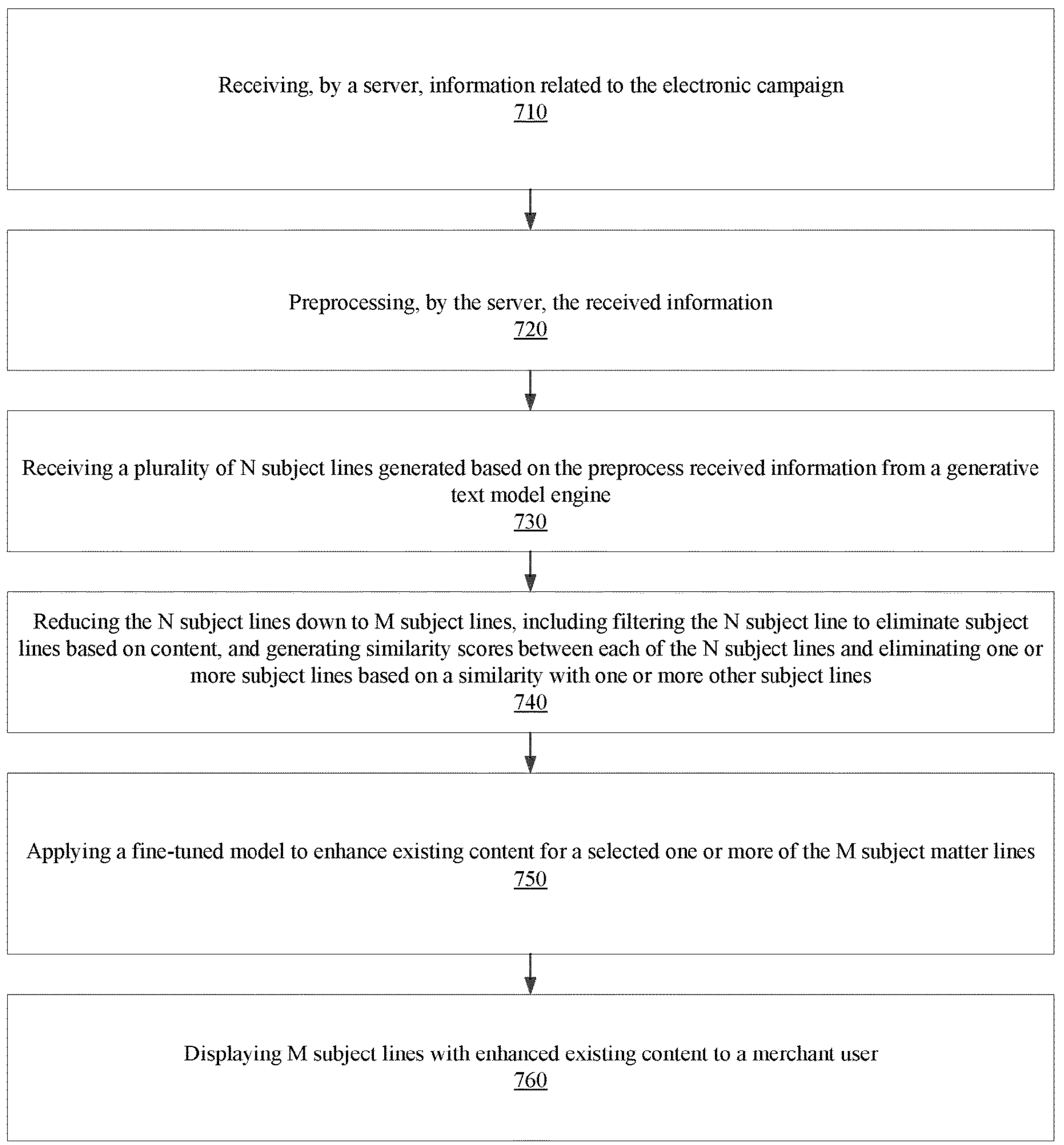
FIG. 7 is a flow chart that includes steps of a method for automatic subject line generation for electronic messages of an electronic campaign of a merchant, according to an embodiment.

FIG. 7 is a flow chart that includes steps of a method for automatic subject line generation for electronic messages of electronic campaigns, according to an embodiment. A first step 710 includes receiving, by a server, information related to the electronic campaign. A second step 720 includes preprocessing, by the server, the received information. A third step 730 includes receiving a plurality of N subject lines generated based on the preprocess received information from a generative text engine model. A fourth step 740 includes reducing the N subject lines down to M subject lines, including filtering the N subject line to eliminate subject lines based on content, and generating similarity scores between each of the N subject lines and eliminating one or more subject lines based on a similarity with one or more other subject lines. A fifth step 750 includes applying a fine-tuned enhancer model to enhance existing content for a selected one or more of the M subject lines. A sixth step 760 includes displaying M subject lines with enhanced existing content to a merchant user.

As previously described, for an embodiment, reducing the N subject lines down to M subject lines, further comprises eliminating subject lines that have greater than a character threshold number of characters.

As previously described, for an embodiment, filtering the N subject line to eliminate subject lines based on content includes eliminating subject lines that include inappropriate and politically sensitive words.

As previously described, for an embodiment, generating similarity scores between each of the N subject lines and eliminating one or more subject lines based on a similarity with one or more other subject lines comprises computing cosine similarities between the subject lines. As previously described, for an embodiment, generating similarity scores between each of the N subject lines and eliminating one or more subject lines based on a similarity with one or more other subject lines comprises prioritizing diversity across displayed subject lines based on pairwise similarity scores.

As previously described, for an embodiment, applying the fine-tuned enhancer model to enhance existing content includes adding emojis to the selected one or more of the M subject lines. For an embodiment, enhancing the existing content is based on collected information from subject lines of past high-performing electronic campaigns and adjusting content of the subject lines to reflect a brand tone of the merchant user based on content and success of past high-performing electronic campaigns and existing website content. For an embodiment, applying a fine-tuned enhancer model to enhance existing content includes adjusting or supplementing to the selected one or more of the M subject lines. For an embodiment, the fine-tuned enhancer model is applied to a selected one or more of the M subject lines.

For an embodiment, the server is electronically connected to a merchant server. Further, the server tracks merchant actions at the merchant server based on the M subject lines displayed. A discriminator model assigns a quality rating for each of the M subject lines based on the tracked merchant actions, and supplements data used to train the fine-tuned enhancer model with J highest quality rating subject lines.

As previously described, at least some embodiments include continuously updating the generative text engine model based on continuously generated quality ratings.

As previously described, for an embodiment, the server is electronically connected to a merchant server, and to a plurality of customer devices. Further, the server, tracks customer actions of customers at the customer devices based on the subject lines displayed to one or more customers of a merchant of the merchant server. A second discriminator model assigns a second quality rating for each of the subject lines displayed to the one or more customers based on the tracked customer action, and supplements data used to train the fine-tuned enhancer model with K highest quality rating subject lines as determined by actions of the one or more customers. For an embodiment, tracking the customer actions comprises sensing the customer actions at the customer devices. For an embodiment, sensing the customer action comprises sensing online action of the one or more customers. For an embodiment, sensing the customer action comprises sensing physical motion of the customer devices of the one or more customers. At least some embodiments further include continuously updating the generative text engine model based on continuously generated second quality ratings. For an embodiment, assigning by the second quality rating by the second discriminator model comprises receiving, by the server, customer actions for electronic messages having different subject lines and a same message content.

Figure 8:
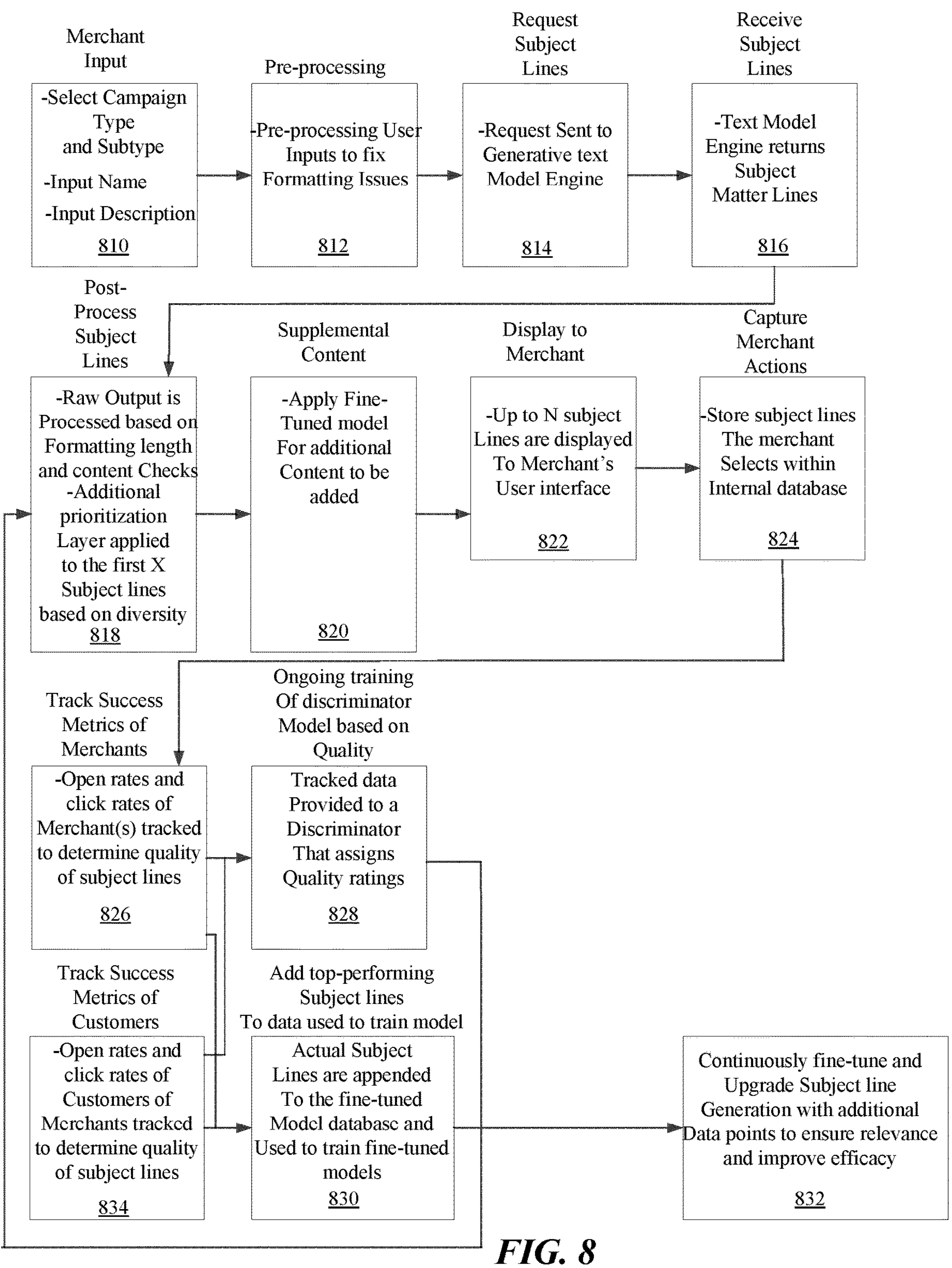
FIG. 8 shows a more detailed system for automatic subject line generation, according to an embodiment.

FIG. 8 is a flow chart that includes steps of another method for automatic subject line generation for electronic messages of an electronic campaign of a merchant, according to another embodiment. A step 810 includes receiving inputs from the merchant, such as, a campaign type and subtype selection. This step may be similar to step 710 of FIG. 7. A step 812 includes pre-processing user (merchant) inputs to fix any formatting issues. This step may be similar to step 720 of FIG. 7. Steps 814 and 816 include requesting and receiving subject lines from a generative text engine model. These steps may be similar as step 730 of FIG. 7. A step 818 includes post-processing of the subject lines, including formatting and content checks. This step may be similar to step 740 of FIG. 7. A step 820 includes applying a fine-tuned enhancer model to add and enhance content of the subject lines. This step may be similar to step 750 of FIG. 7. A step 822 includes displaying up to N subject lines to a user interface of the merchant. This step may be similar to step 750 of FIG. 7. A step 824 includes storing the subject lines in an internal database which can then be selected by the merchant user.

Once displayed to the merchant, the success and quality of the presented subject lines is tracked and determined. Based on the tracked success and quality of the subject lines used for electronic messaging with the merchant, a discriminator model is continuously trained. Further, for an embodiment, based on the tracked success and quality of the subject lines used for electronic messaging with customers of the merchant, a second discriminator model is continuously trained.

A step 826 includes tracking success or quality of the subject lines based on merchant actions, such as, selections, edits, and use in campaigns of generated subject lines. A step 828 includes ongoing training of the discriminator model (such as, discriminator model 252) based on the tracked successes of the subject lines.

A step 830 includes adding top-performing subject lines to data used to train the text generator model as previously shown in FIG. 6.

A step 832 includes continuously fine-tuning and upgrading the subject line generation with additional data to ensure relevance and efficacy of the future generated subject lines. By expanding the number of subject lines processed by the fine-tuned enhancer aided text generator model, the text generation model should be expected to produce text that will more closely follow patterns similar to real-life subject lines.

A step 834 includes tracking success or quality of the subject lines based on actions of customers of the merchant, such as, open and click rates of messages that include the subject lines. As previously described, the merchant actions and the customer actions are used to evaluate the quality of the subject lines presented to the merchant and/or the customer. The describe discriminators and the generative text engine model are trained based on the quality subject line quality determinations. The trained models provide better recommendations in the futures, thereby improving the subject line generation over time.

Further, for at least some embodiments, the steps 828 and 830 further account for subject line success based on tracked success based on actions of the customers of the merchants.

Although specific embodiments have been described and illustrated, the embodiments are not to be limited to the specific forms or arrangements of parts so described and illustrated. The described embodiments are to only be limited by the claims.

What is claimed:

1. A computer-implemented method for processing machine-generated subject lines, comprising:

requesting, via a graphical user interface, information comprising a specified type and description of an electronic campaign;

receiving, by a server, said information related to the electronic campaign;

preprocessing, by the server, the received information for sending to a generative text engine model, wherein the preprocessing comprises checking formatting, removing keywords, and ensuring the user has provided sufficient information;

sending to the generative text engine model the preprocessed received information, wherein the generative text engine model is operable to return text based on a given text prompt;

receiving a plurality of N subject lines generated based on the preprocessed received information from the generative text engine model;

reducing, by the server, the N subject lines down to M subject lines, wherein the reducing comprises:

generating similarity scores by embedding subject lines as vectors using vectorization methods and computing, for each pair of subject lines, a cosine similarity score;

eliminating one of the pair based on whether the cosine similarity score exceeds a first similarity threshold;

computing cosine similarity scores between at least one subject line and the merchant-provided description using the vectorization methods;

eliminating one or more subject lines when a cosine similarity score between a subject line and the merchant-provided description exceeds a second similarity threshold different from the first similarity threshold; and wherein when the reducing results in less than a threshold number of subject lines, resending a request to the generative text engine model to generate additional subject lines;

assigning, by a trained second discriminator model, a second quality rating for each of the M subject lines, wherein the second discriminator model was trained based on historical tracked customer user actions including opens and clicks that included a displayed subject line; and reducing the M subject lines to K subject lines based on the second quality rating;

applying a fine-tuned enhancer model to enhance existing content for a selected one or more of the K subject lines;

displaying K subject lines with enhanced content to a merchant user;

displaying select subject lines to customer users at the customer user devices;

tracking customer user actions based on the select subject lines displayed to the customer users at the customer user devices, wherein the customer user devices operate alone or optionally, in conjunction with a server and/or merchant server to sense customer user actions;

analyzing the customer user actions responsive for success metrics corresponding to the displayed subject lines including open rates and click rates;

carrying out a first training, wherein the first training comprises training, through a discriminator improvement cycle, the second discriminator model to assign a second quality rating to a subject line based on the analyzed customer user actions including open rates and click rates, and updating the second discriminator model at the conclusion of the discriminator improvement cycle; and carrying out a second training, wherein the second training comprises training. through a text generation improvement cycle, the generative text engine model based on subject lines meeting a second quality rating threshold as updated by the second discriminator model during the first training, and updating the generative text engine model at the conclusion of the text generation improvement cycle.

2. The method of claim 1, wherein reducing the N subject lines down to M subject lines, further comprises eliminating subject lines that have greater than a character threshold number of characters.

3. The method of claim 1, wherein the reducing the N subject lines to eliminate subject lines comprises filtering the N subject line to eliminate subject lines based on content, including eliminating subject lines that include inappropriate and politically sensitive words.

4. The method of claim 1, wherein generating similarity scores between each of the N subject lines and eliminating one or more subject lines based on a similarity with one or more other subject lines comprises prioritizing diversity across displayed subject lines based on pairwise similarity scores.

5. The method of claim 1, wherein applying the fine-tuned enhancer model to enhance existing content includes adding emojis to the selected one or more of the K subject lines.

6. The method of claim 5, wherein enhancing the existing content is based on collected information from subject lines of past high-performing electronic campaigns and adjusting content of the subject lines to reflect a brand tone of the merchant user based on content and success of past high-performing electronic campaigns and existing website content.

7. The method of claim 1, wherein applying a fine-tuned enhancer model to enhance existing content includes adjusting or supplementing the selected one or more of the K subject lines.

8. The method of claim 1, wherein the server is electronically connected to the merchant server, and further comprising:

tracking, by the server, merchant actions at the merchant server based on the M subject lines displayed;

assigning, by a first discriminator model, a quality rating for each of the M subject lines based on the tracked merchant actions; and supplementing data used to train the fine-tuned enhancer model with J highest quality rating subject lines.

9. The method of claim 8 further comprising continuously updating the generative text engine model based on continuously generated quality ratings.

10. The method of claim 1, further comprising:
supplementing data used to train the fine-tuned enhancer model with the K highest quality rating subject lines as determined by actions of the one or more customers.

11. The method of claim 1, wherein the sensing the customer actions comprises sensing online action of the one or more customers.

12. The method of claim 1, wherein the sensing the customer actions comprises sensing physical motion of the customer devices of the one or more customers.

13. The method of claim 1, wherein assigning by the second quality rating by the second discriminator model comprises receiving, by the server, customer actions for electronic messages having different subject lines and a same message content.

14. A system for processing machine-generated subject lines, comprising:
a merchant server operable to sense customer user actions at a plurality of customer user devices and to provide the sensed customer user actions to a management server;
the management server electronically connected to the merchant server through a network, the management server configured to:
receive information from a merchant user of the merchant server;
preprocess the received information for sending to a generative text engine model, wherein the preprocessing comprises checking formatting, removing keywords, and ensuring the user has provided sufficient information;
retrieve a plurality of N subject lines generated based on the preprocessed received information from the generative text engine model;
reduce the N subject lines down to M subject lines, comprising:
generating similarity scores by embedding subject lines as vectors using vectorization methods and computing, for each pair of subject lines, a cosine similarity score;
eliminating one of the pair based on whether the cosine similarity score exceeds a first similarity threshold;
computing cosine similarity scores between at least one subject line and the merchant-provided description using the vectorization methods;
eliminating one or more subject lines when a cosine similarity score between a subject line and the merchant-provided description exceeds a second similarity threshold different from the first similarity threshold; and
wherein when the reducing results in less than a threshold number of subject lines. resending a request to the generative text engine model to generate additional subject lines;
apply a fine-tuned enhancer model to enhance existing content for a selected one or more of the M subject lines, wherein the fine-tuned enhancer model is operable of altering one or more keywords within a subject line and to append text onto the subject line;
the management server further configured to:
communicate the M subject lines to the merchant server;
wherein the merchant server is configured to display the M subject lines with enhanced existing content to the merchant user.

15. The system of claim 14, wherein the management server is further configured to:
track merchant actions at the merchant server based on the M subject lines displayed;
wherein a first discriminator model is configured to:
assign a quality rating for each of the M subject lines based on the tracked merchant actions; and
wherein the management server is further configured to:
supplement data used to train the fine-tuned enhancer model with J highest quality rating subject lines.

16. The system of claim 14, further comprising a plurality of customer devices electronically connected to the server through the network;
wherein the management server is further configured to:
track customer actions of customers at the customer devices based on the subject lines displayed to one or more customers of a merchant of the merchant server;
train a second discriminator model based on historical tracked customer user actions;
wherein the trained second discriminator model is configured to:
assign a second quality rating for each of the subject lines displayed to the one or more customers based on the tracked customer actions; and
wherein the management server is further configured to:
reduce the M subject lines to K subject lines based on the second quality rating;
send at least one of the displayed K subject lines to customer users;
update the second discriminator model based on the tracked customer user actions to complete a discriminator improvement cycle; and
repeat the send, track, train and update steps through multiple discriminator improvement cycles, for multiple electronic campaigns.

17. The system of claim 16, wherein the customer user devices comprise location and motion sensors for tracking the locations and motions of the customer user, and wherein the tracked locations and motions of the customer user can be included within a first score of the customer user action, and wherein a first score that exceeds a threshold score is deemed a customer user action.

* * * * *